(12) United States Patent
Maeda et al.

(10) Patent No.: US 9,444,960 B2
(45) Date of Patent: Sep. 13, 2016

(54) IMAGE FORMING APPARATUS

(71) Applicant: FUJI XEROX CO., LTD., Tokyo (JP)

(72) Inventors: Shoichi Maeda, Kanagawa (JP);
Takuya Mori, Kanagawa (JP); Yusuke Itozaki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/731,994

(22) Filed: Jun. 5, 2015

(65) Prior Publication Data

US 2016/0142572 A1    May 19, 2016

(30) Foreign Application Priority Data

Nov. 14, 2014 (JP) ................................. 2014-231302

(51) Int. Cl.
*G06F 15/00* (2006.01)
*H04N 1/00* (2006.01)

(52) U.S. Cl.
CPC ...... *H04N 1/00663* (2013.01); *H04N 1/00477* (2013.01); *H04N 1/00689* (2013.01); *H04N 1/00692* (2013.01); *H04N 1/00771* (2013.01)

(58) Field of Classification Search
CPC ....................... H04N 1/00692; H04N 1/00771
USPC ................................................ 358/1.13–1.15
See application file for complete search history.

(56) References Cited

U.S. PATENT DOCUMENTS

2002/0041786 A1* 4/2002 Sato ..................... B41J 11/0075
400/624
2006/0087070 A1* 4/2006 Cook ....................... B65H 1/00
271/145

FOREIGN PATENT DOCUMENTS

| JP | 6-67445 U | 9/1994 |
| JP | 10-17203 A | 1/1998 |
| JP | 2007-106573 A | 4/2007 |

* cited by examiner

*Primary Examiner* — Saeid Ebrahimi Dehkord
(74) *Attorney, Agent, or Firm* — Sughrue Mion, PLLC

(57) ABSTRACT

An image forming apparatus includes a sheet accommodating portion that is attachable to and removable from an apparatus body and that is capable of accommodating a sheet therein; a detecting part that detects the presence/absence of a sheet in the sheet accommodating portion; a fixing part that fixes the status of detection by the detecting part to a sheet absent state when the sheet accommodating portion is not attached to the apparatus body; an informing part that informs a user of the status of the apparatus; and a control part that causes the informing part to inform the user of the possibility of a sheet left in the apparatus when the status of detection by the detecting part changes from a sheet present state to the sheet absent state during standby when printing is not performed.

8 Claims, 19 Drawing Sheets

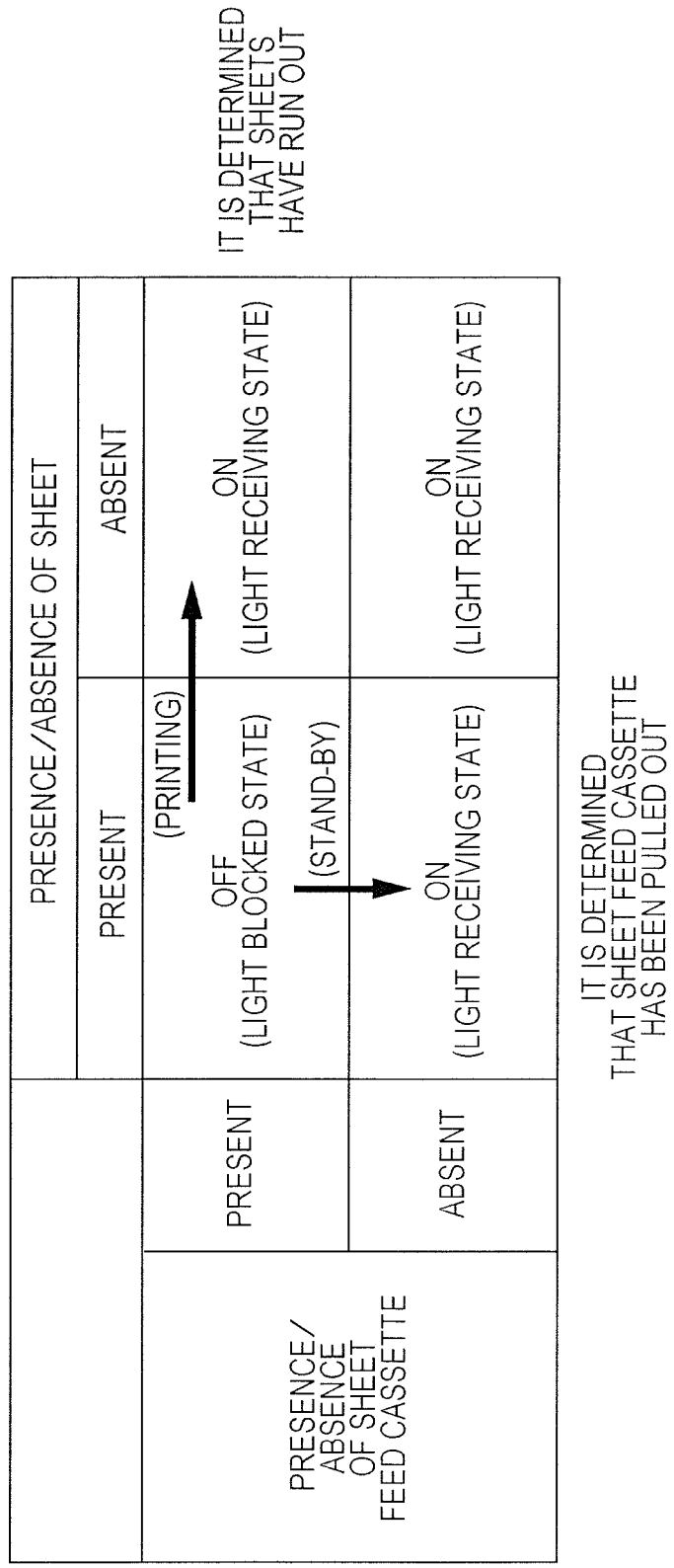

IMAGE FORMING APPARATUS

CROSS-REFERENCE TO RELATED APPLICATIONS

This application is based on and claims priority under 35 USC 119 from Japanese Patent Application No. 2014-231302 filed Nov. 14, 2014.

BACKGROUND

The present invention relates to image forming apparatuses.

SUMMARY

According to an aspect of the invention, there is provided an image forming apparatus including: a sheet accommodating portion that is attachable to and removable from an apparatus body and that is capable of accommodating a sheet therein; a detecting part that detects the presence/absence of a sheet in the sheet accommodating portion; a fixing part that fixes the status of detection by the detecting part to a sheet absent state when the sheet accommodating portion is not attached to the apparatus body; an informing part that informs a user of the status of the apparatus; and a control part that causes the informing part to inform the user of the possibility of a sheet left in the apparatus when the status of detection by the detecting part changes from a sheet present state to the sheet absent state during standby when printing is not performed.

BRIEF DESCRIPTION OF THE DRAWINGS

An exemplary embodiment of the present invention will be described in detail based on the following figures, wherein:

FIG. 21 shows logic states of the light switch corresponding to the respective states shown in FIGS. 17 to 20.

DETAILED DESCRIPTION

Next, an exemplary embodiment of the present invention will be described in detail below with reference to the drawings.

Figure 1:
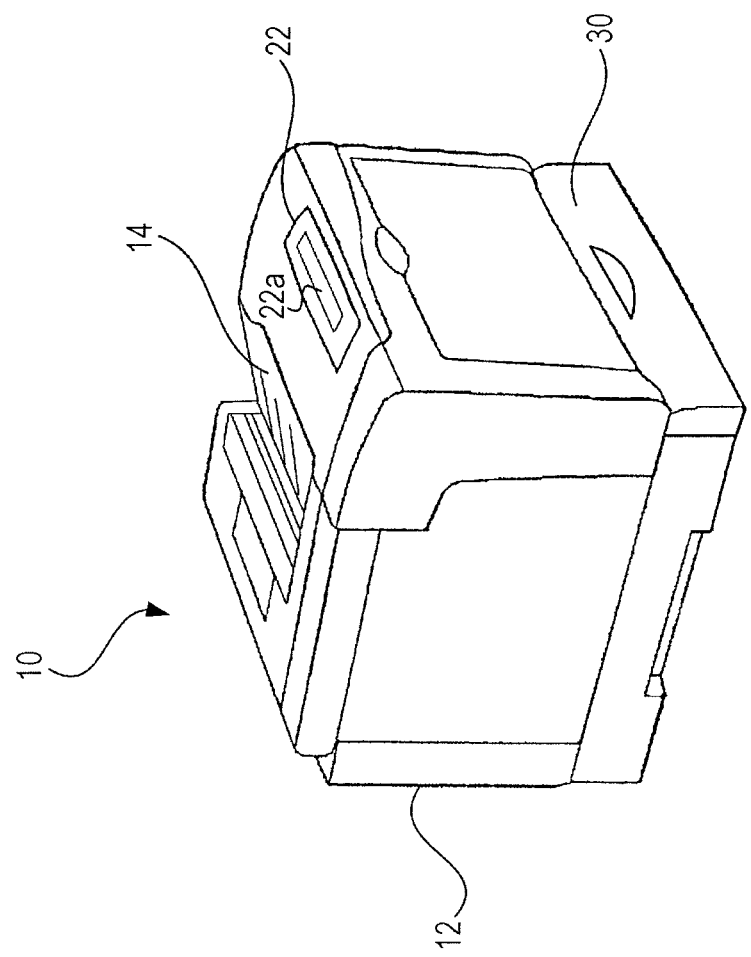
FIG. 1 is an external perspective view of an image forming apparatus according to an exemplary embodiment of the present invention.

FIG. 1 is an external perspective view of an image forming apparatus 10 according to the exemplary embodiment of the present invention.

As shown in FIG. 1, the image forming apparatus 10 according to this exemplary embodiment includes an image forming apparatus body 12. An output portion 14, onto which printed sheets (recording media) are output, is provided at the top of the image forming apparatus body 12. The image forming apparatus 10 also includes, at the upper part in the front surface thereof, a control panel (user interface portion) 22 that has various operation buttons via which a user inputs various operations and has a display 22a, serving as an informing part, that informs the user of the status of the image forming apparatus 10.

Furthermore, a sheet feed cassette (sheet accommodating portion) 30 that is attachable to and removable from the image forming apparatus body 12 and accommodates sheets to be used for printing is provided below the image forming apparatus body 12.

The image forming apparatus 10 according to this exemplary embodiment is configured such that a user loads new sheets (sheet supply) into the sheet feed cassette 30 by completely removing it from the image forming apparatus body 12.

Figure 2:
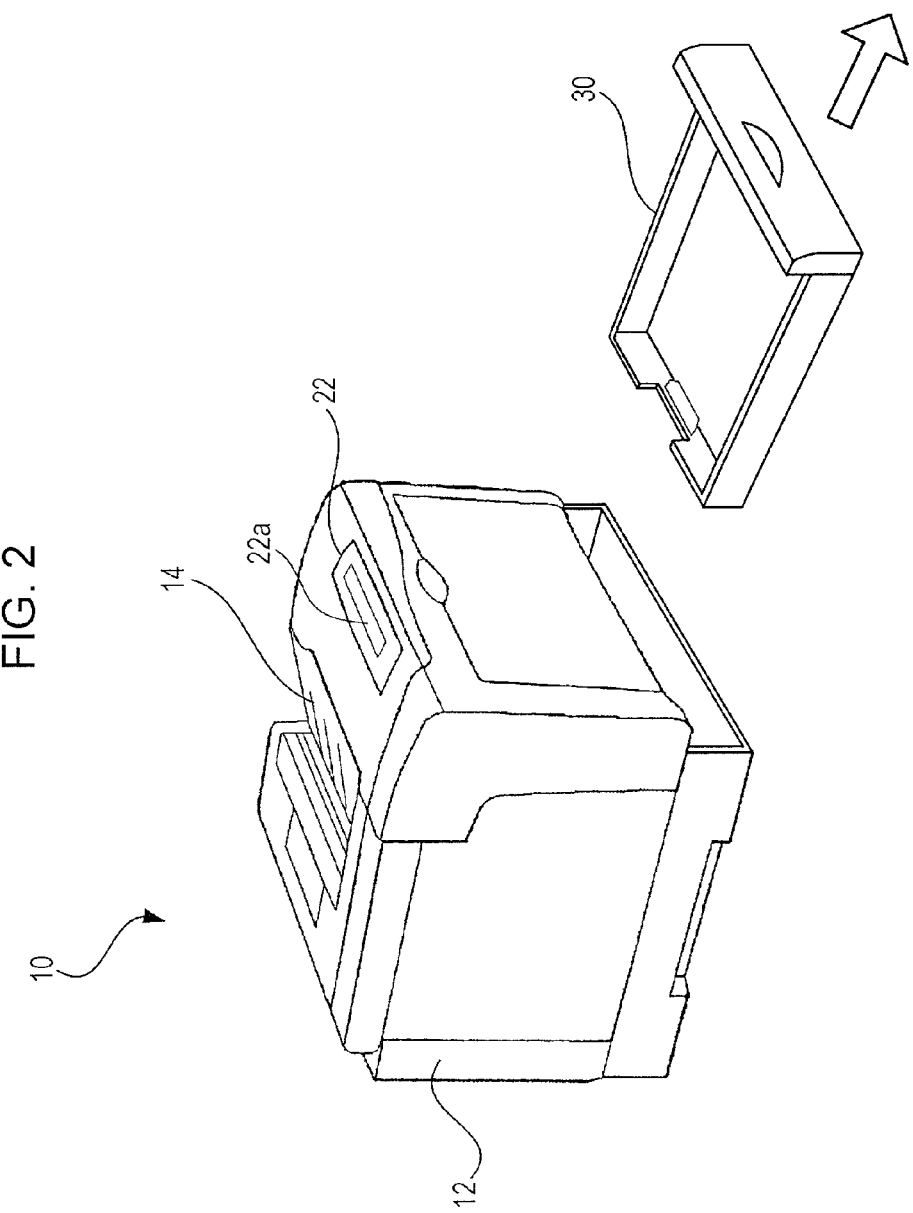
FIG. 2 shows that a sheet feed cassette is removed from an image forming apparatus body.

FIG. 2 shows that the sheet feed cassette 30 is removed from the image forming apparatus body 12. When the sheets in the sheet feed cassette 30 have run out, the user pulls out the sheet feed cassette 30 from the image forming apparatus body 12, as shown in FIG. 2, and supplies new sheets.

Figure 3:
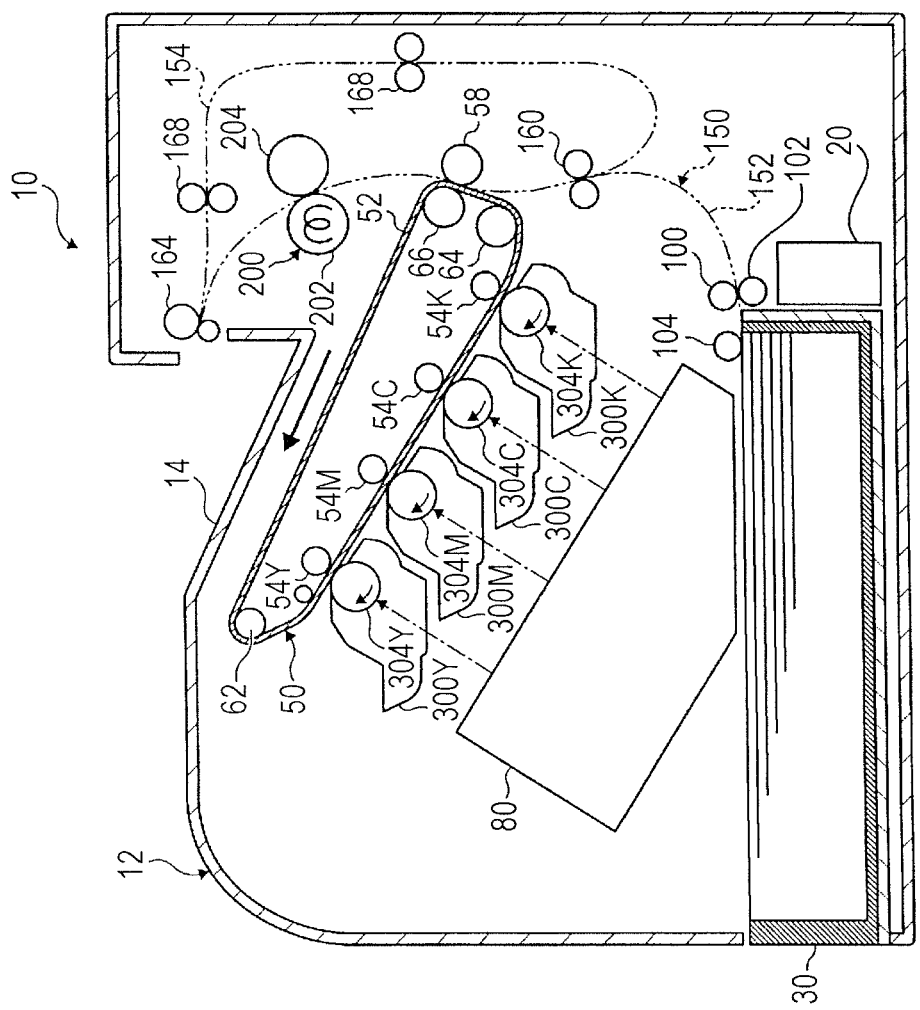
FIG. 3 is a sectional view of the image forming apparatus according to the exemplary embodiment of the present invention.

FIG. 3 shows a sectional view of the image forming apparatus 10 shown in FIG. 1.

The image forming apparatus 10 includes a transfer device 50, a latent image forming device 80, a sheet detecting device 20, the sheet feed cassette 30, a fixing device 200, and image forming units 300Y, 300M, 300C, and 300K. Furthermore, a transport path 150 for transporting sheets is formed in the image forming apparatus 10.

The image forming units 300Y, 300M, 300C, and 300K are attachable to and removable from the image forming apparatus body 12 from, for example, the front side (i.e., near side in FIG. 3). The image forming units 300Y, 300M, 300C, and 300K include photoconductor drums 304Y, 304M, 304C, and 304K, respectively, and form yellow, magenta, cyan, and black developer images thereon by using yellow, magenta, cyan, and black developers.

The photoconductor drums 304Y, 304M, 304C, and 304K are rotated in a direction indicated by arrows shown in FIG. 3 by a driving force transmitted thereto.

The transfer device 50 includes an intermediate transfer body 52, first transfer rollers 54Y, 54M, 54C, and 54K, and a second transfer roller 58. The intermediate transfer body 52 has, for example, an endless belt shape, is supported by support rollers 62, 64, and 66, and is rotated in a stretched state. The first transfer rollers 54Y, 54M, 54C, and 54K are each supplied with a first transfer bias, whereby the developer images formed on the surfaces of the photoconductor drums 304Y, 304M, 304C, and 304K are transferred to the intermediate transfer body 52. The second transfer roller 58 is supplied with a second transfer bias, whereby the developer held on the intermediate transfer body 52 is transferred to a sheet.

In this exemplary embodiment, the support roller 66 serves as a driving roller that transmits a driving force from a driving force source, such as a motor, to the intermediate transfer body 52 via a driving force transmitting mechanism (not shown). The support roller 66 is rotated by the driving force transmitted thereto, causing the intermediate transfer body 52 to rotate in a direction indicated by the arrow shown in FIG. 3.

The latent image forming device 80 irradiates the surfaces of the photoconductor drums 304Y, 304M, 304C, and 304K, which have been uniformly charged by charging devices (not shown), with laser light to form latent images.

The fixing device 200 includes a heating roller 202 that heats a sheet and a pressure roller 204 that presses the sheet against the heating roller 202.

The image forming apparatus 10 further includes a pick-up roller (sending roller) 104 that is pressed against the sheet at the top of the sheets accommodated in the sheet feed cassette 30 and picks up the sheet from the sheet feed cassette 30. The pick-up roller 104 successively picks up the sheets accommodated in the sheet feed cassette 30. Furthermore, a feed roller 100 and a retard roller 102 that face each other are provided on the downstream side of the pick-up roller 104 in the sheet transport direction. The feed roller 100 and the retard roller 102 separate the sheets picked up by the pick-up roller 104 into individual sheets so as to prevent the sheets from being transported in an adhered manner and then transport the sheets toward the transport path 150.

The transport path 150 includes a principal transport path 152 and an inversion transport path 154. The principal transport path 152 is a transport path that guides a sheet from the sheet feed cassette 30 to the second transfer roller 58, then to the fixing device 200, and then to the output portion 14. The sheet feed cassette 30, the registration roller 160, the second transfer roller 58, the fixing device 200, and the output roller 164 are provided in this order along the principal transport path 152, from the upstream side in the sheet transport direction.

The registration roller 160 temporarily stops the movement of the leading end of the sheet transported toward the second transfer roller 58 and then restarts the movement of the leading end of the sheet toward the second transfer roller 58 at the same time when a portion of the intermediate transfer body 52 having a developer image transferred thereto reaches the position of the second transfer roller 58.

The output roller 164 transports the sheet having the developer image fixed thereto by the fixing device 200 toward the output portion 14. Furthermore, the output roller 164 is rotatable both in a direction in which the sheet is output onto the output portion 14 and a direction in which the sheet is transported from the output portion 14 toward the inversion transport path 154. The inversion transport path 154 is used when an image is formed on the other side of the sheet having an image formed on one side thereof, and the inversion transport path 154 transports the sheet from the output roller 164 toward the upstream side of the registration roller 160. For example, two inversion transport rollers 168 are provided along the inversion transport path 154. When an image is to be formed on the other side of a sheet having an image formed on one side thereof, the output roller 164 is rotated in the reverse direction with the trailing end of the sheet being in contact with the output roller 164, guiding the sheet toward the inversion transport path 154 from the trailing end thereof and transporting the sheet to the registration roller 160.

The sheet detecting device 20 is provided to detect the presence/absence of a sheet accommodated in the sheet feed cassette 30. The detailed configuration of the sheet detecting device 20 will be described below.

With the above-described configuration, the image forming apparatus 10 according to this exemplary embodiment performs printing on the sheets accommodated in the sheet feed cassette 30 and outputs them onto the output portion 14.

Figure 4:
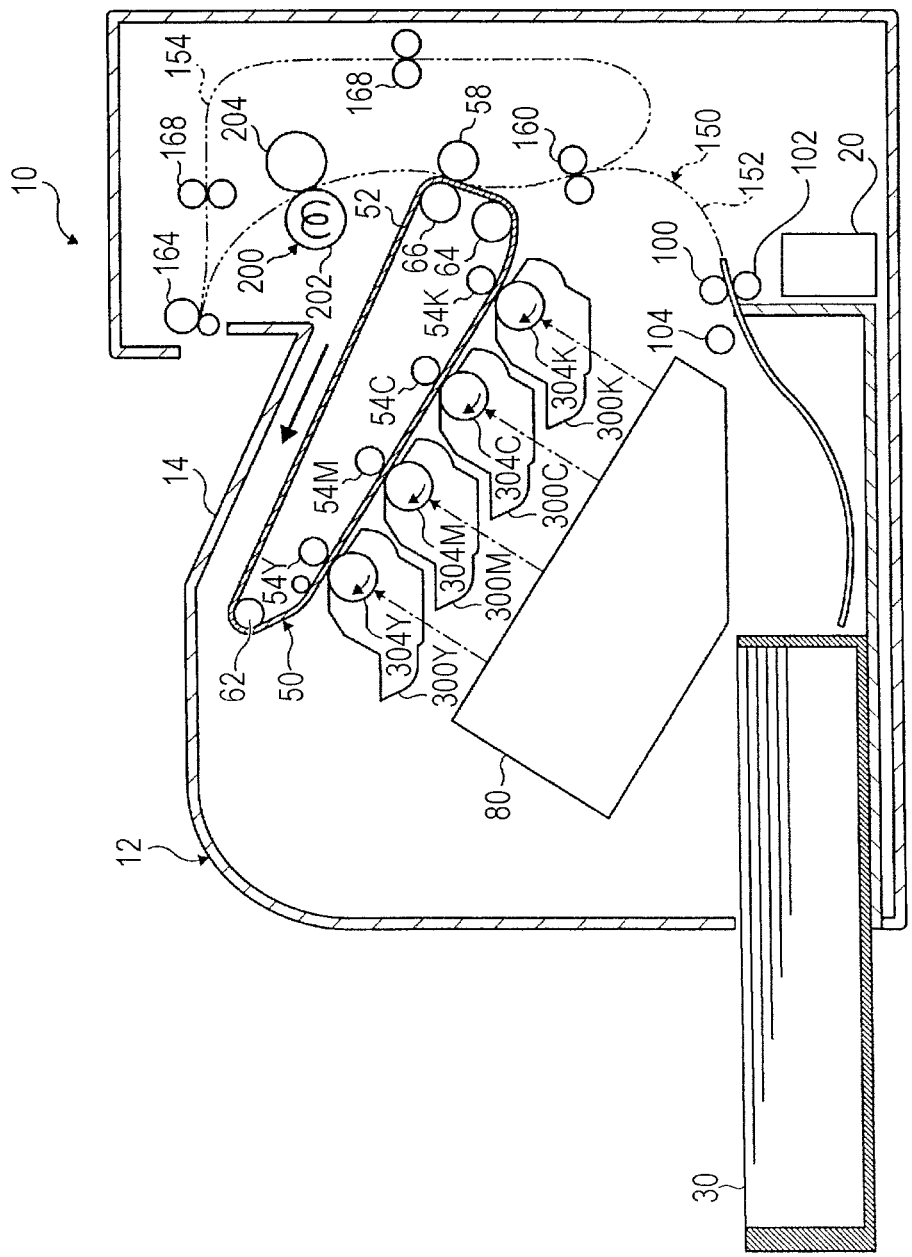
FIG. 4 is a sectional view similar to FIG. 3, showing a state where the sheet feed cassette is pulled out of the image forming apparatus body.

FIG. 4 is a sectional view similar to FIG. 3, showing a state where the sheet feed cassette 30 is pulled out of the image forming apparatus body 12.

FIG. 4 shows that the sheet feed cassette 30 accommodating sheets therein is pulled out of the image forming apparatus body 12. In FIG. 4, because the sheet feed cassette 30 is pulled out of the image forming apparatus body 12 with a sheet pinched between the feed roller 100 and the retard roller 102, the sheet is left in the image forming apparatus body 12.

Figure 5:
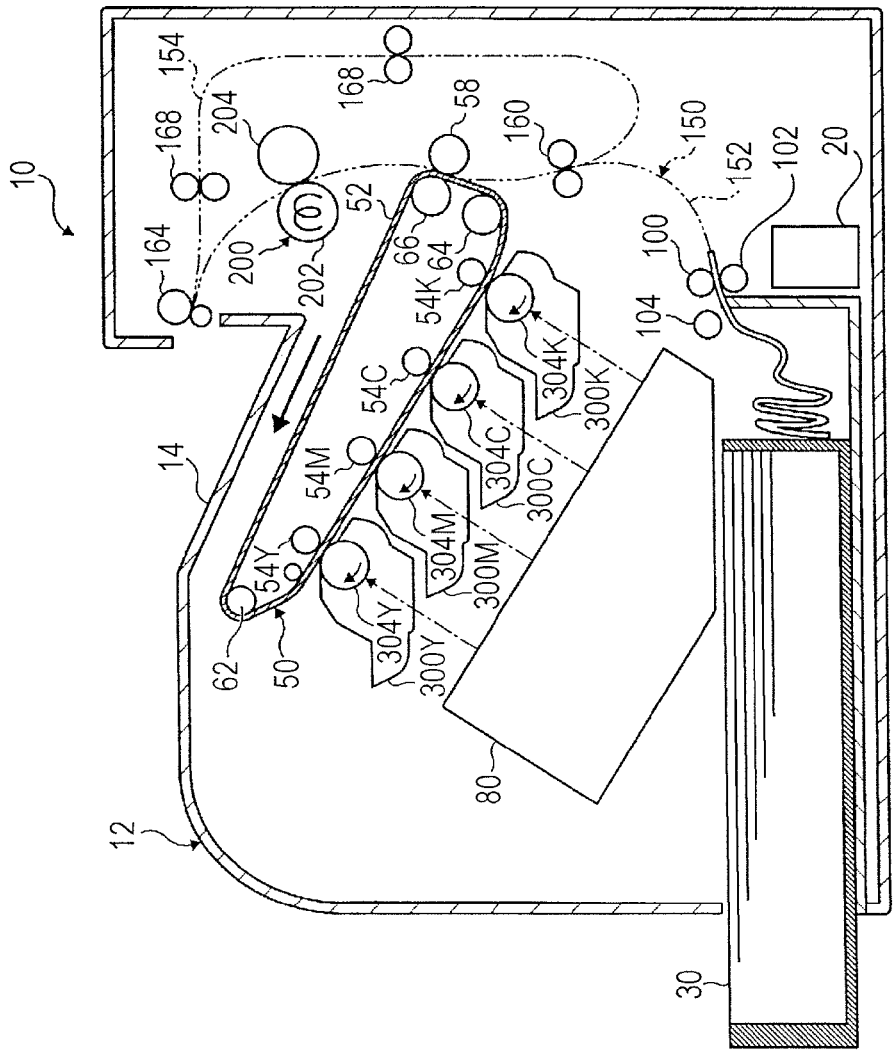
FIG. 5 shows that the sheet feed cassette is inserted into the image forming apparatus body in the state shown in FIG. 4.

FIG. 5 shows that the sheet feed cassette 30 is inserted into the image forming apparatus body 12 in the state shown in FIG. 4.

In FIG. 5, the sheet left in the image forming apparatus body 12 is pushed by the sheet feed cassette 30 and is deformed into a bellows shape. In this situation, a user has to remove the sheet pushed into the image forming apparatus body 12 before starting printing.

Note that the above-described situation does not occur when the sheets accommodated in the sheet feed cassette 30 have run out during printing and the sheet feed cassette 30 is pulled out to supply sheets. However, the sheet feed cassette 30 is pulled out of the image forming apparatus body 12 with sheets accommodated therein when new sheets are supplied before the sheets in the sheet feed cassette 30 have run out, when the amount of sheets accommodated in the sheet feed cassette 30 is checked, or when the type of the sheets accommodated in the sheet feed cassette 30 is changed in the middle of printing.

To prevent the above-described situation, when the sheet feed cassette 30 accommodating at least one sheet is pulled out of the image forming apparatus body 12, the image forming apparatus 10 according to this exemplary embodiment informs a user to that effect and requests the user to check for any sheet left in the image forming apparatus body 12 and to remove it if there is such a sheet before attaching the sheet feed cassette 30 to the image forming apparatus body 12.

In the image forming apparatus 10 according to this exemplary embodiment, the above-described sheet detecting device 20 detects that the sheet feed cassette 30 accommodating a sheet has been pulled out.

Figure 6:
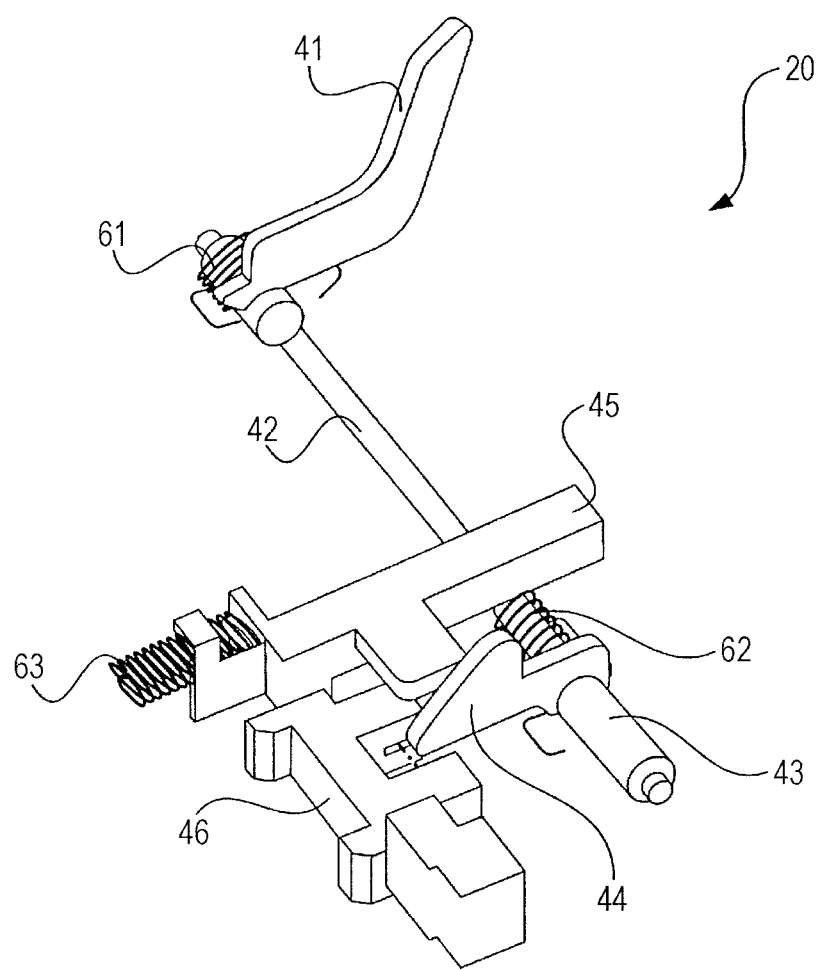
FIG. 6 shows the configuration of a sheet detecting device of the image forming apparatus according to the exemplary embodiment of the present invention.

Referring to FIG. 6, the configuration of the sheet detecting device 20 will be described in detail below.

As shown in FIG. 6, the sheet detecting device 20 includes a sensor arm (detecting lever) 41, a rotation member (first rotation member) 42, a rotation member (second rotation member) 43, a sensor arm (changing member) 44, a slider (slide member) 45, a light switch (sheet presence/absence detecting sensor) 46, springs 61 and 62, and a slide spring 63.

The sensor arms 41 and 44, the rotation members 42 and 43, and the light switch 46 form a detecting part that detects the presence/absence of a sheet in the sheet feed cassette 30.

The slider 45 serves as a fixing part that forcedly fixes the status of detection by the light switch 46 to ON (i.e., sheet absent state) when the sheet feed cassette 30 is not attached to the image forming apparatus body 12, regardless of the presence/absence of a sheet accommodated in the sheet feed cassette 30.

The light switch 46 is turned on or off depending on whether a predetermined position irradiated with light is blocked by the sensor arm 44. In this exemplary embodiment, "ON" of the light switch 46 corresponds to the sheet absent state, and "OFF" of the light switch 46 corresponds to the sheet present state.

Although this exemplary embodiment describes an example case where the presence/absence of a sheet is detected by using the light switch 46, the present invention is not limited to such a configuration. The present invention may be equally applicable to a case where another type of switch that is turned ON and OFF by an externally applied physical force other the light switch 46 is used, instead of the light switch 46. Because which of "ON" and "OFF" corresponds to which of the sheet present state and the sheet absent state varies depending on the switch used, the present invention is not limited by the combination of ON or OFF and the sheet present state or the sheet absent state.

The rotation member 42 has the sensor arm 41 that detects the presence/absence of a sheet, and the sensor arm 41 is urged toward the sheet accommodated in the sheet feed cassette 30 by the spring 61.

The rotation member 43 is provided coaxial with the rotation member 42 and has the sensor arm 44 that switches the status of detection by the light switch 46. The sensor arm 44 is urged by the spring 62 in a direction in which the light switch 46 is turned on. The rotation member 43 is configured to rotate in a direction in which the sensor arm 44 turns the light switch 46 off, in accordance with the rotation of the rotation member 42.

The slider 45 has a lock lever (not shown) that fixes the rotation member 43 so as not to rotate, with the light switch 46 kept ON. The lock lever is urged by the slide spring 63 so as to fix the rotation member 43. When the sheet feed cassette 30 is attached to the image forming apparatus body 12, the slider 45 is pushed, releasing the rotation member 43 so as to be rotatable.

Note that the spring (second elastic member) 62 that urges the rotation member 43 has a larger coefficient of elasticity than that of the spring (first elastic member) 61 that urges the rotation member 42, and the slide spring (third elastic member) 63 that urges the slider 45 has a larger coefficient of elasticity than the spring 62.

Figure 7:
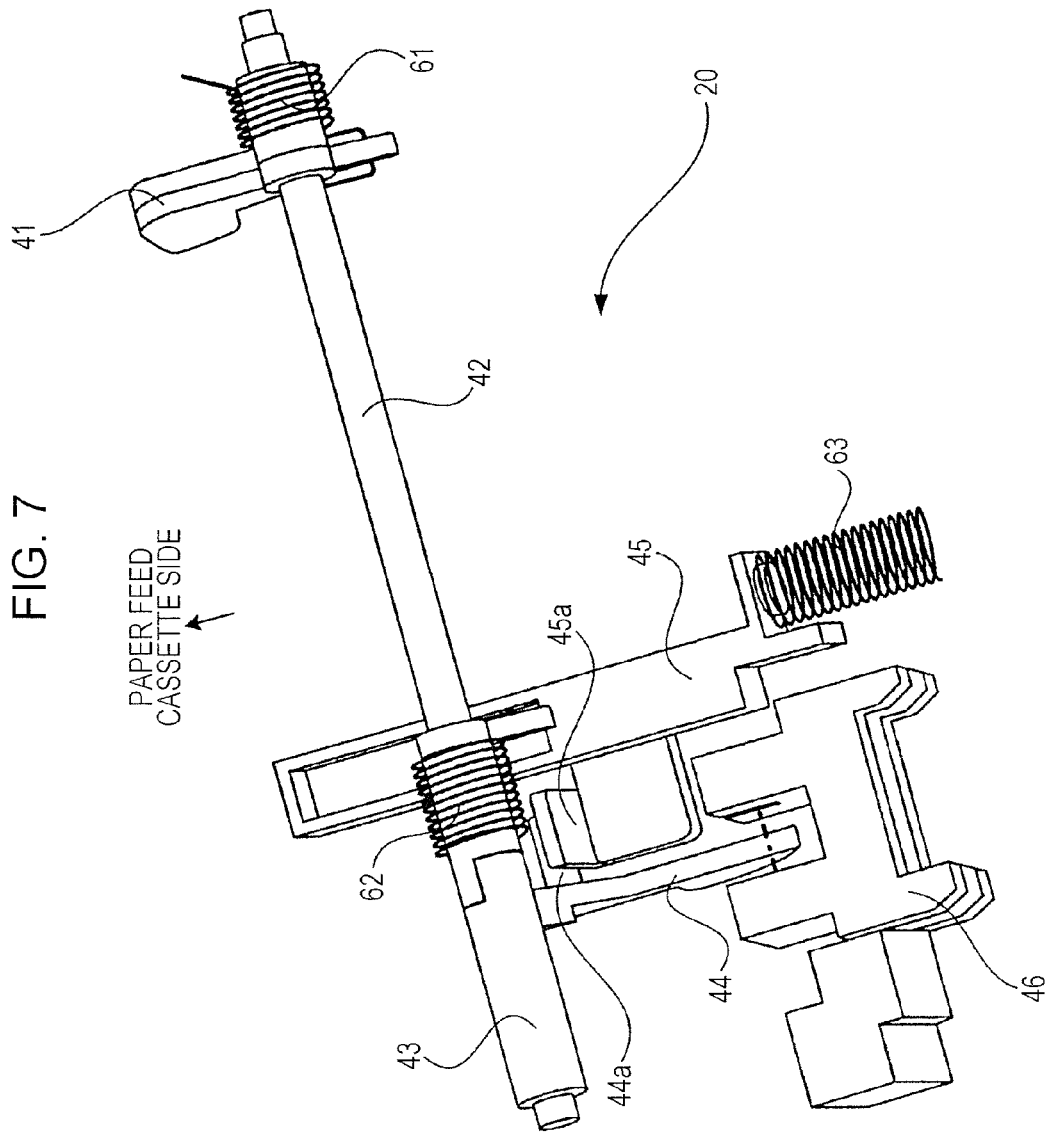
FIG. 7 shows the sheet detecting device of the image forming apparatus according to the exemplary embodiment of the present invention, as viewed from the back.

FIG. 7 shows the sheet detecting device 20 as viewed from the back.

Referring to FIG. 7, the rotation member 42 and the rotation member 43 are coaxially joined to each other. Thus, when the rotation member 42 is rotated, the rotation member 43 is also rotated.

In FIG. 7, a lock lever 45a provided on the slider 45 presses a boss 44a provided on the sensor arm 44. When the slider 45 is pushed by the sheet feed cassette 30, the lock lever 45a releases the boss 44a, allowing the sensor arm 44 to freely rotate.

Referring to the block diagram shown in FIG. 8, the functional configuration of the image forming apparatus 10 according to this exemplary embodiment for controlling an image forming operation according to the status of detection by the light switch 46 will be described below.

Figure 8:
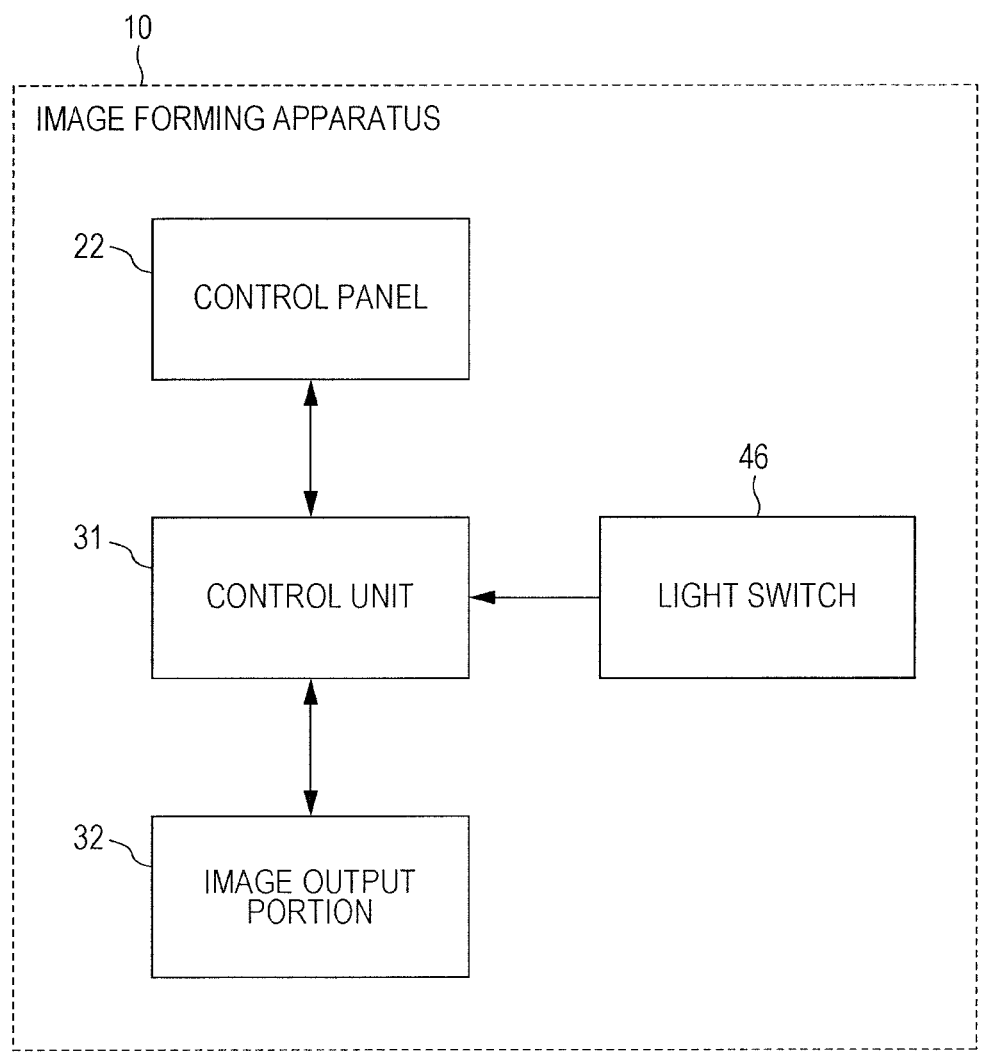
FIG. 8 is a block diagram showing the functional configuration for controlling an image forming operation according to the status of detection by a light switch.

As shown in FIG. 8, the image forming apparatus 10 according to this exemplary embodiment has a control unit 31. The control unit 31 has a central processing unit (CPU), which executes predetermined processing according to control programs stored in a memory or a storage device to control the operation of the image forming apparatus 10.

The control unit 31 controls image forming processing performed by the image output portion 32 according to the input via the control panel 22, and it also controls the image output portion 32 and the control panel 22 according to the status of detection by the light switch 46.

The image output portion 32 includes the latent image forming device 80, the transfer device 50, the second transfer roller 58, the fixing device 200, the image forming units 300Y, 300M, 300C, and 300K, etc., as mentioned above.

When the status of detection by the light switch 46 changes from the sheet present state to the sheet absent state during standby when the image forming apparatus 10 does not perform printing, the control unit 31 informs the user of the possibility of the presence of a sheet left in the apparatus, via the display 22a of the control panel 22.

Figure 9:
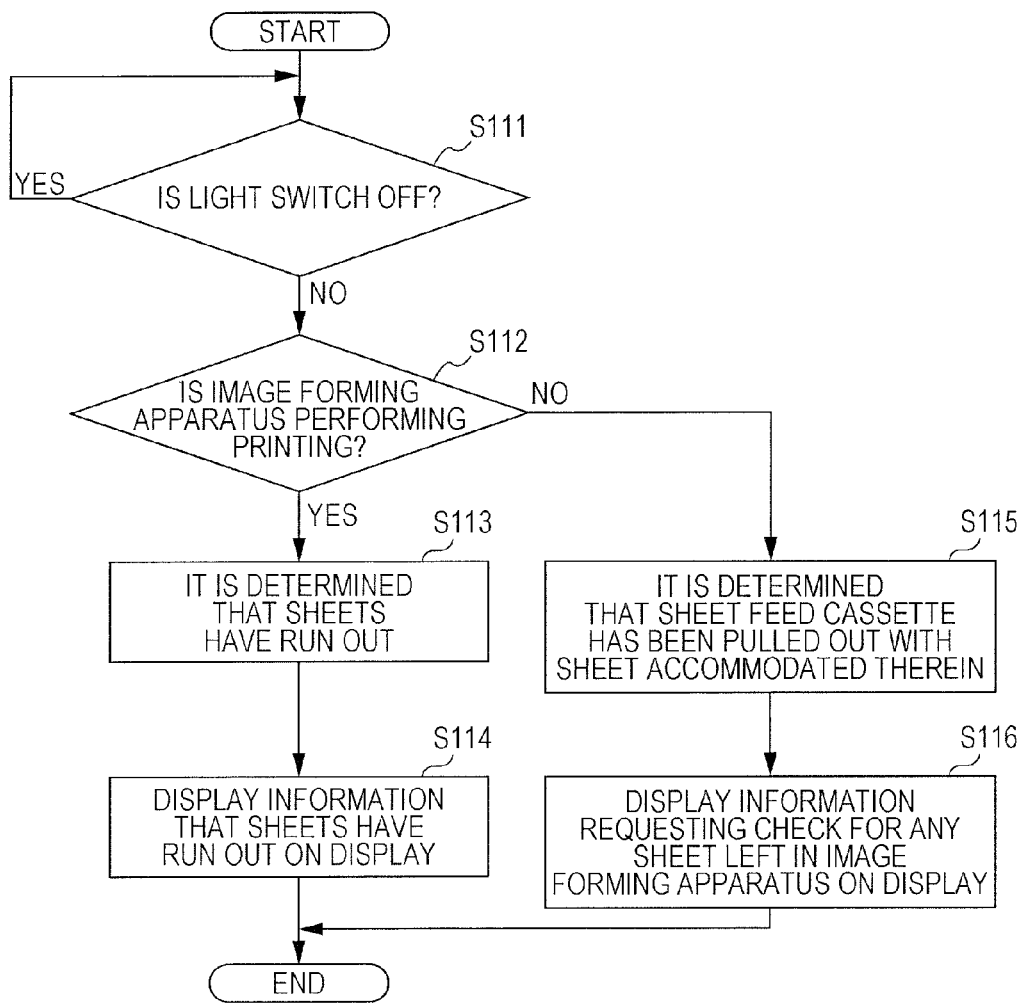
FIG. 9 is a flowchart showing a detailed operation performed by a control unit.

The detailed operation performed by the control unit 31 will be described by referring to the flowchart in FIG. 9.

When there is a sheet in the sheet feed cassette 30, and the sheet feed cassette 30 is properly attached to the image forming apparatus body 12, the status of detection by the light switch 46 is OFF (step S111).

In this state, when the light switch 46 is turned on from off (in step S111, NO), the control unit 31 determines if the image forming apparatus 10 is performing printing (step S112).

When it is determined that the image forming apparatus 10 is performing printing in step S112 (in step S112, YES), the control unit 31 determines that the sheets have run out (step S113), stops printing and displays information that the sheets have run out on the display 22a of the control panel 22 (step S114).

When it is determined that the image forming apparatus 10 is not performing printing in step S112 (in step S112, NO), that is, when it is determined that the image forming apparatus 10 is in standby, the control unit 31 determines that the sheet feed cassette 30 has been pulled out of the image forming apparatus body 12 with a sheet accommodated therein (step S115) and displays information requesting check for any sheet left in the image forming apparatus body 12 on the display 22a of the control panel 22 (step S116).

Figure 10:
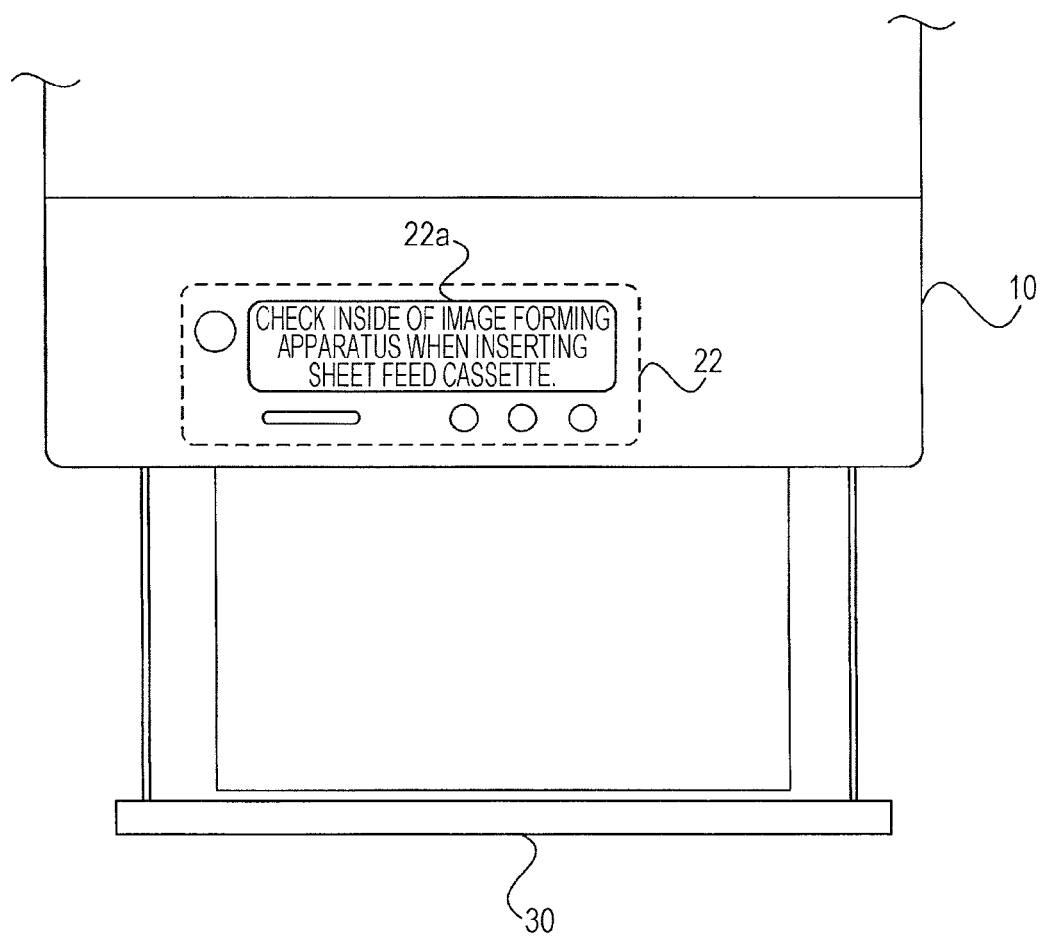
FIG. 10 shows a specific example when the control unit informs a user via a display.

FIG. 10 shows a specific example when the control unit 31 informs the user via the display 22a. In FIG. 10, the display 22a of the control panel 22 shows a message "check inside of image forming apparatus when inserting sheet feed cassette", thereby requesting the user to remove any sheet left in the image forming apparatus body 12 before inserting the sheet feed cassette 30.

Note that the control unit 31 does not inform the user if the light switch 46 is ON (sheet absent state) at the time of power-on or waking from a sleep mode. The control unit 31 may inform the user of the possibility of a sheet left in the apparatus only when the status of detection by the light switch 46 changes from off (sheet present state) to on (sheet absent state) for the first time after printing is completed.

Although this exemplary embodiment has described an example case where the user is informed via the display 22a, the user may be informed via any other informing part, such as a lamp or voice, that is capable of informing the user of the status of the apparatus.

Furthermore, although this exemplary embodiment has described an example case where the user is informed about the possibility of a sheet left in the apparatus via the control panel 22 of the image forming apparatus 10, the user may be informed via a terminal device, such as a personal computer, that sends print data to the image forming apparatus 10.

Furthermore, the control unit 31 informs the user that the sheets have run out via the informing part, such as the display 22a, when the status of detection by the light switch 46 changes from OFF to ON while the image forming apparatus 10 is performing printing.

Next, the positional relationship between the above-described sheet detecting device 20 and sheet feed cassette 30 will be described with reference to FIG. 11.

Figure 11:
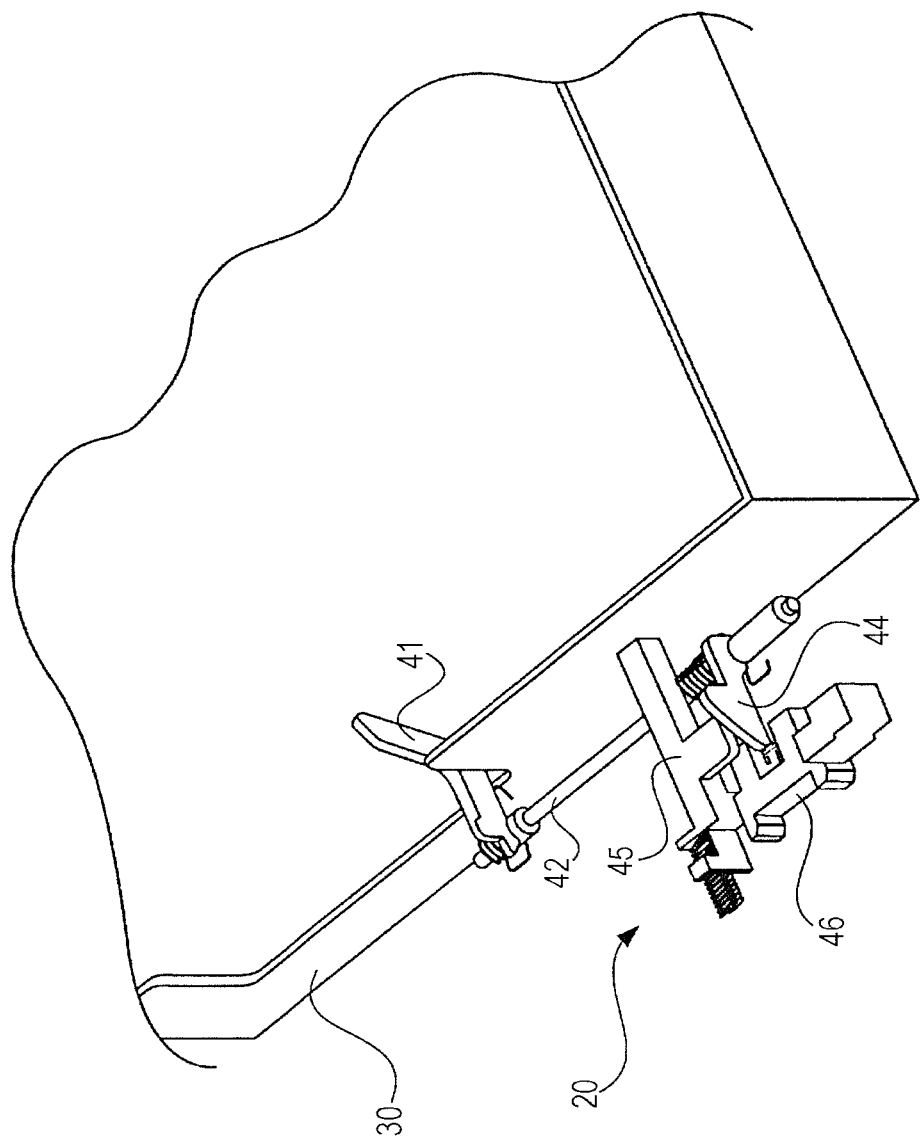
FIG. 11 shows the positional relationship between the sheet detecting device and the sheet feed cassette.

FIG. 11 shows that the sheet feed cassette 30 accommodating no sheet therein is attached to the image forming apparatus body 12 and is in contact with the sheet detecting device 20, inside the image forming apparatus 10. Note that FIG. 11 does not show structures other than the sheet detecting device 20 and the sheet feed cassette 30.

Referring to FIG. 11, the sheet feed cassette 30 is attached to the image forming apparatus body 12. Hence, the slider 45 is pushed, and the sensor arm 44 is released. In FIG. 11, because there is no sheet in the sheet feed cassette 30, the sensor arm 41 is not pushed by the sheet. Thus, the sensor arm 44 does not block the light of the light switch 46.

Figure 12:
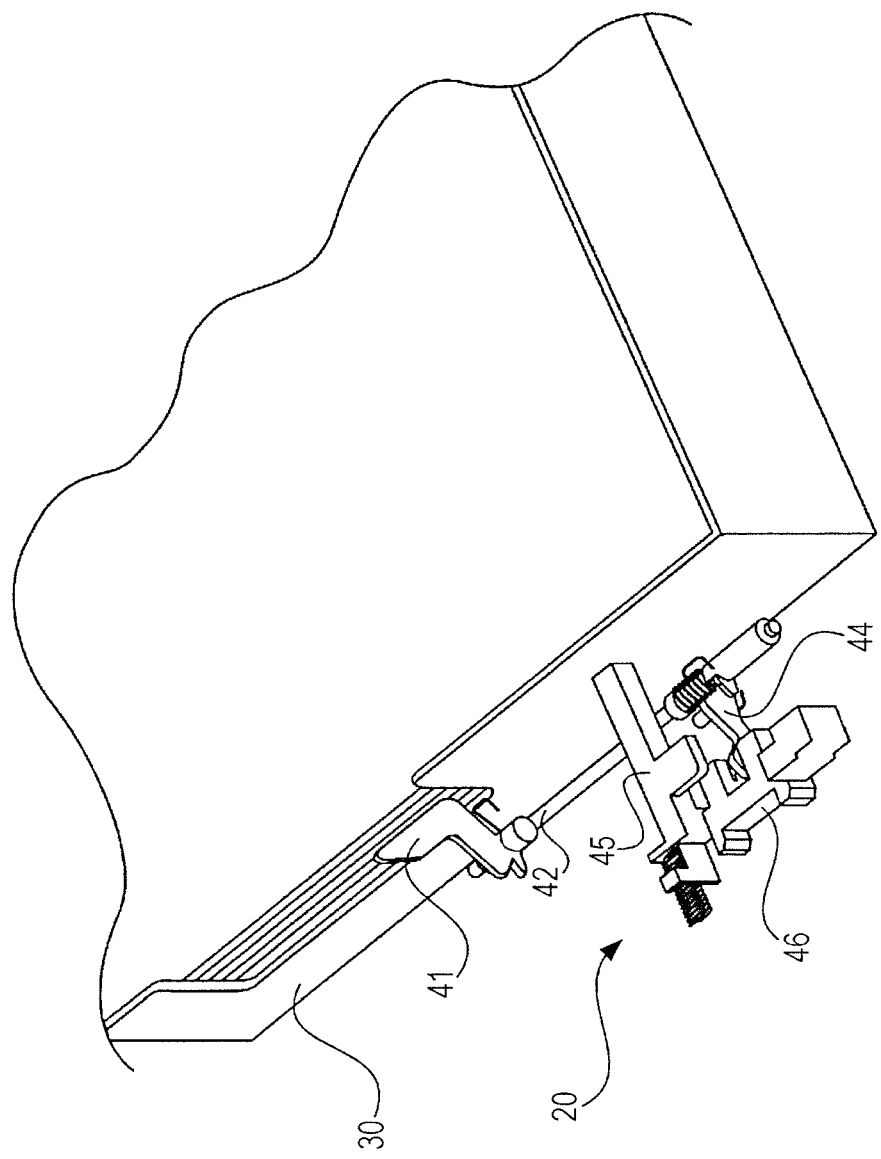
FIG. 12 shows that the sheet feed cassette accommodating sheets therein is attached to the image forming apparatus body and is in contact with the sheet detecting device.

FIG. 12 shows that the sheet feed cassette 30 accommodating sheets is attached to the image forming apparatus body 12 and is in contact with the sheet detecting device 20.

Also in FIG. 12, the sheet feed cassette 30 is attached to the image forming apparatus body 12, and hence, the slider 45 is pushed, and the sensor arm 44 is released. In FIG. 12, the sheets in the sheet feed cassette 30 push the sensor arm 41, rotating the rotation members 42 and 43. Thus, the sensor arm 44 blocks the light of the light switch 46.

FIGS. 13 to 16 show the above-described sheet detecting device 20 as viewed from the back.

Figure 13:
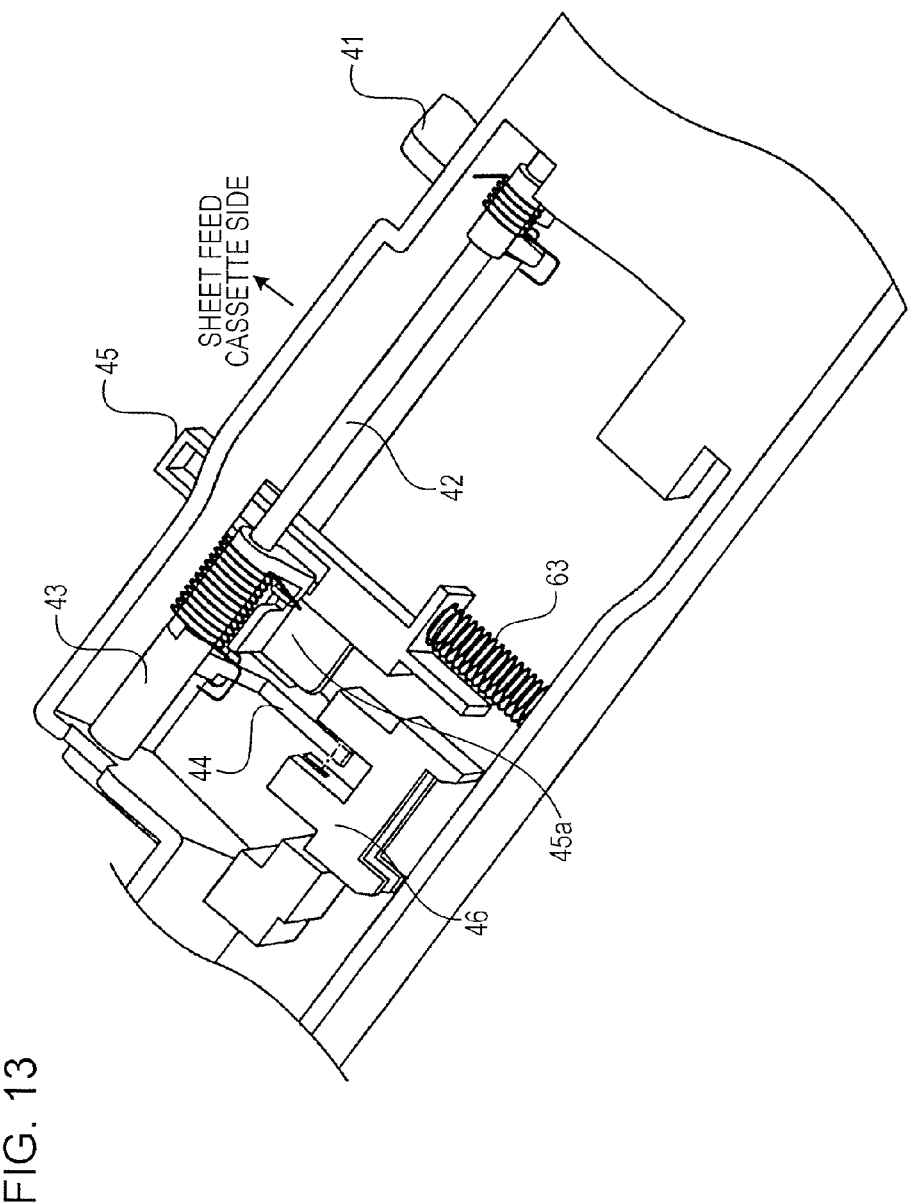
FIG. 13 shows the sheet detecting device as viewed from the back.
Figure 14:
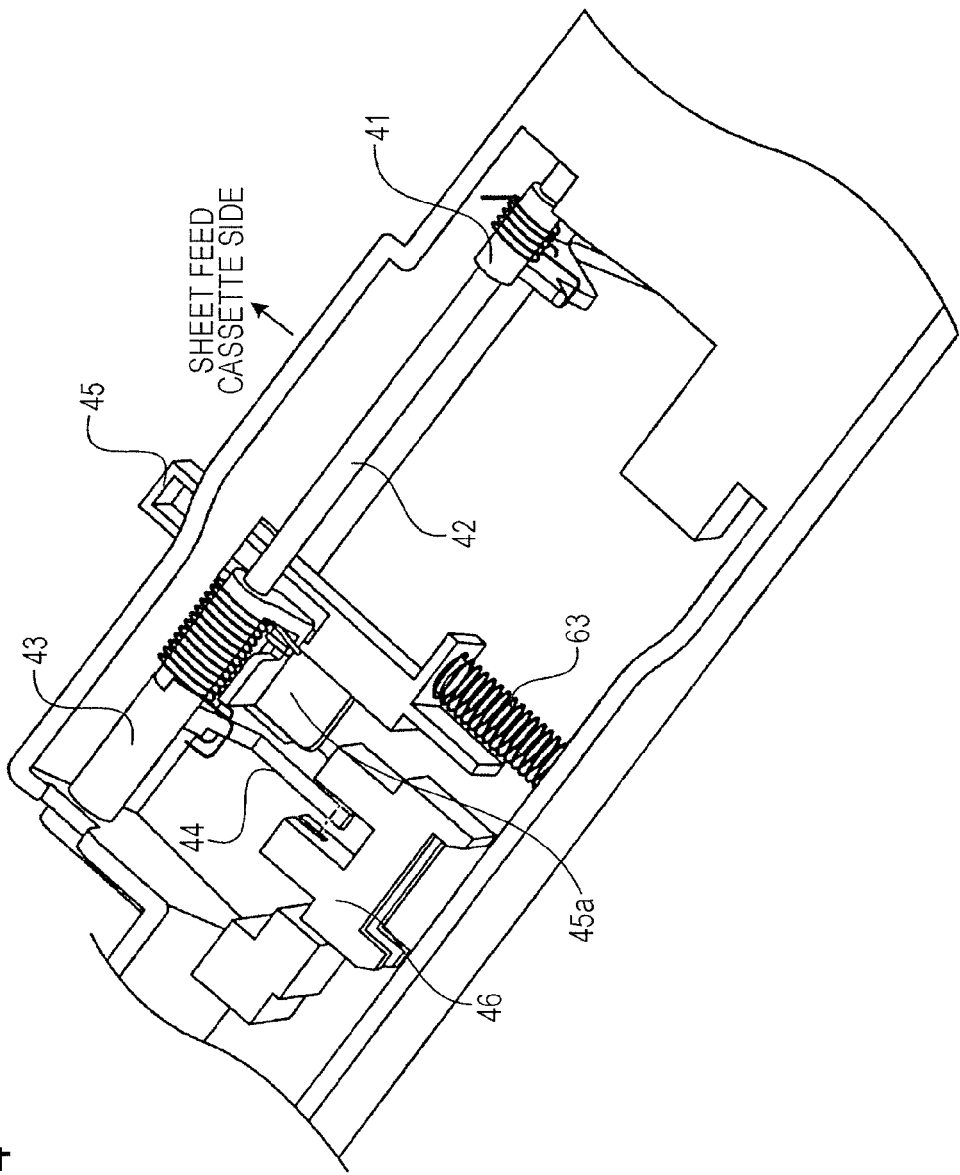
FIG. 14 shows the sheet detecting device as viewed from the back.

FIG. 13 shows that the sheet feed cassette 30 is not attached to the image forming apparatus body 12, and there is no sheet pushing the sensor lever 41. FIG. 14 shows that the sheet feed cassette 30 is not attached to the image forming apparatus body 12, and there is a sheet pushing the sensor lever 41. More specifically, FIG. 14 shows a case where a sheet is left in the apparatus when the sheet feed cassette 30 is pulled out of the apparatus.

Figure 15:
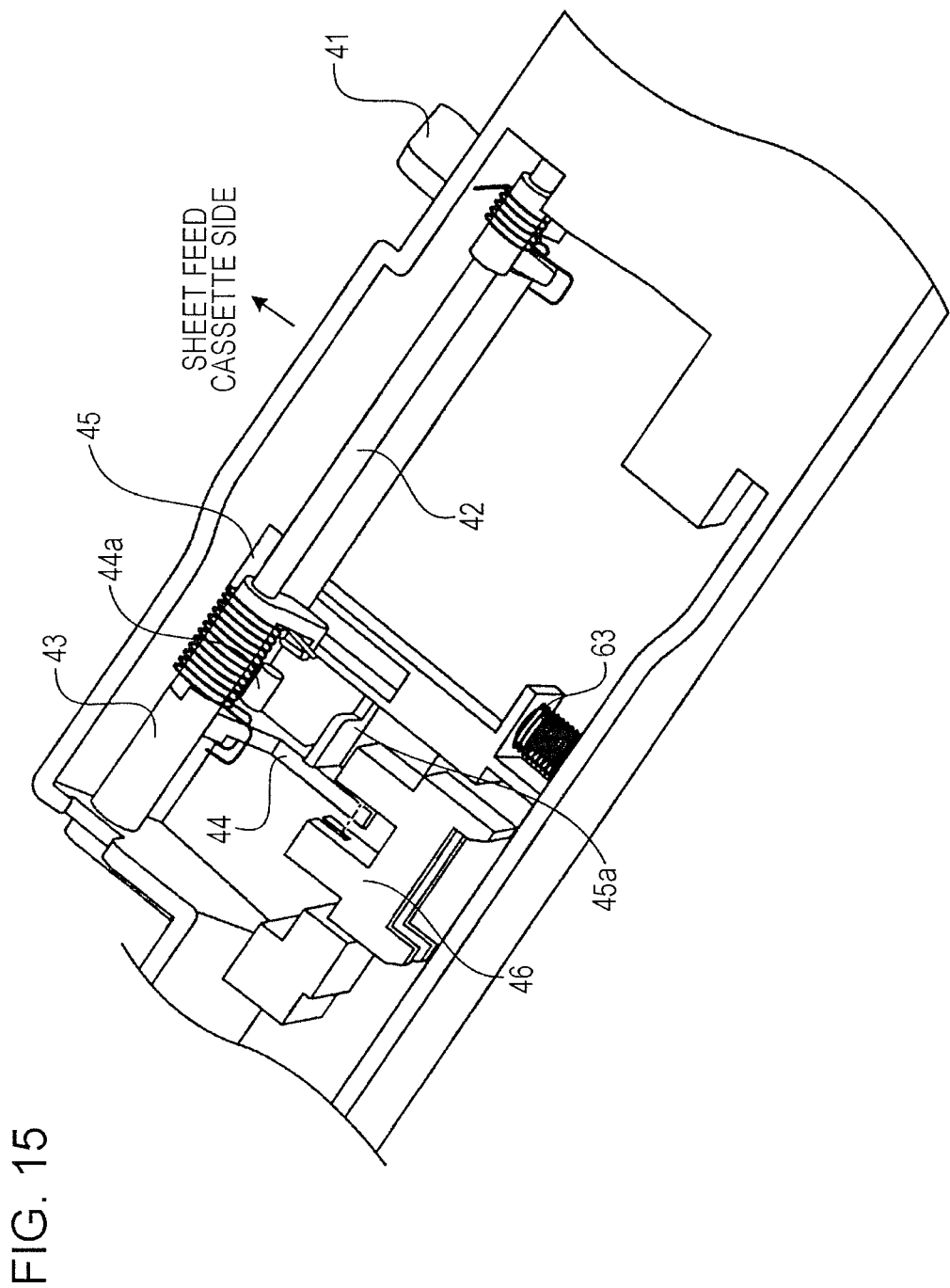
FIG. 15 shows the sheet detecting device as viewed from the back.
Figure 16:
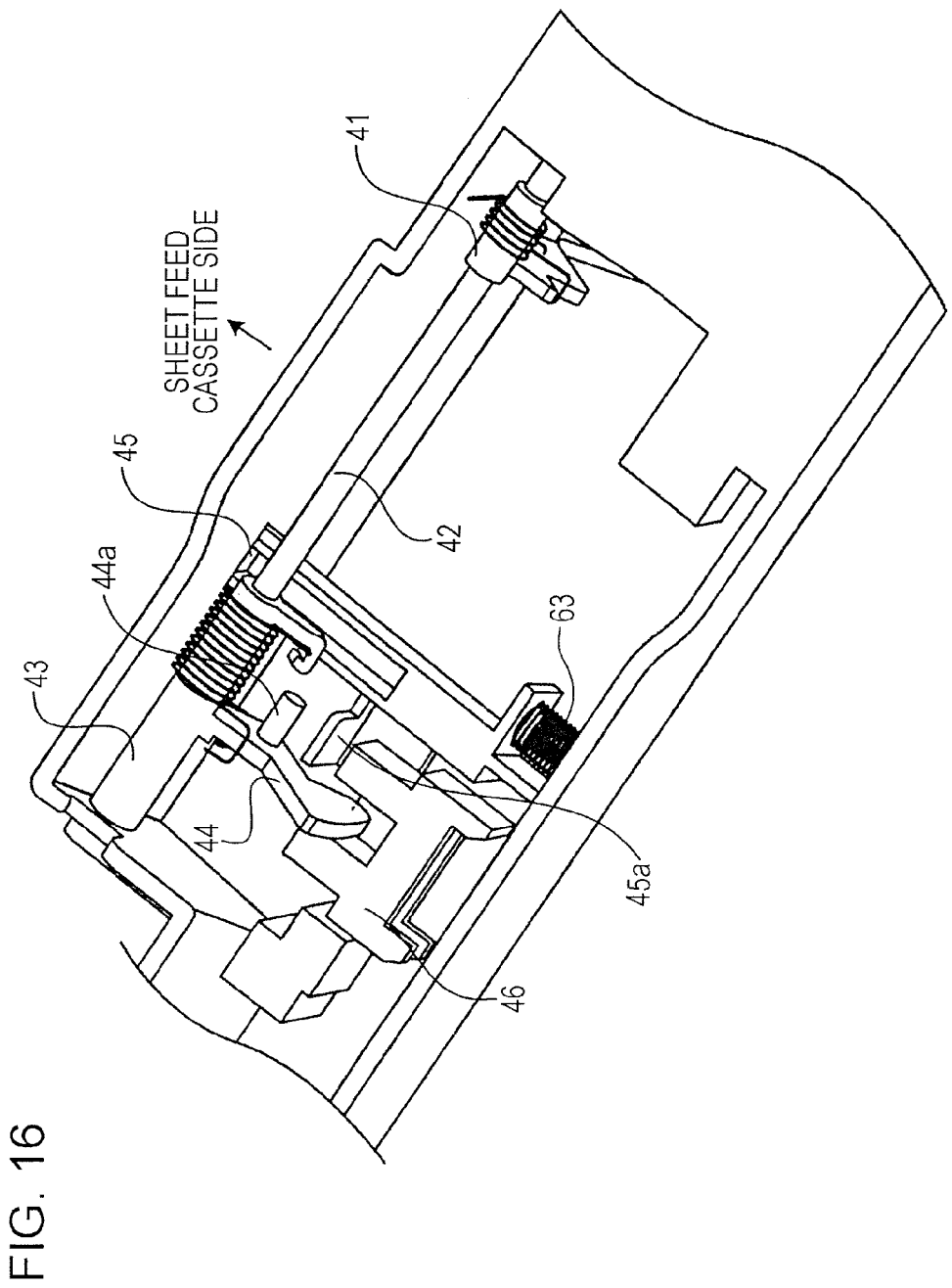
FIG. 16 shows the sheet detecting device as viewed from the back.

FIG. 15 shows that the sheet feed cassette 30 is attached to the image forming apparatus body 12, and there is no sheet pushing the sensor lever 41. FIG. 16 shows that the sheet feed cassette 30 is attached to the image forming apparatus body 12, and there is a sheet pushing the sensor lever 41.

Referring to FIGS. 13 and 14, because the sheet feed cassette 30 is not attached to the image forming apparatus body 12, the lock lever 45a of the slider 45 locks the boss (not shown) of the sensor lever 44. Hence, in FIGS. 13 and 14, the light sensor 46 stays ON regardless of the presence/absence of a sheet.

Referring to FIGS. 15 and 16, because the sheet feed cassette 30 is attached to the image forming apparatus body 12, the slider 45 is pushed toward the image forming apparatus body 12 by the sheet feed cassette 30, and the lock lever 45a of the slider 45 releases the boss 44a of the sensor lever 44. Hence, in FIGS. 15 and 16, the sensor arm 44 is movable in conjunction with the sensor arm 41.

In FIG. 15, because there is no sheet, the sensor arm 41 does not move from the initial position, and the sensor lever 44 also does not move from the initial position. As a result, the light switch 46 stays ON. However, because there is a sheet in FIG. 16, the sensor lever 41 moves from the initial position, and the sensor lever 44 also moves from the initial position. As a result, the sensor lever 44 moves to a position where it blocks the light of the light switch 46, turning off the light switch 46.

Next, the operation of the above-described sheet detecting device 20 will be described with reference to FIGS. 17 to 20. Because FIGS. 17 to 20 are schematic diagrams for explaining the operation in a simplified manner, the shapes, sizes, positional relationships, etc., of the respective members are different from those of the sheet detecting device 20 shown in FIG. 6.

Figure 17:
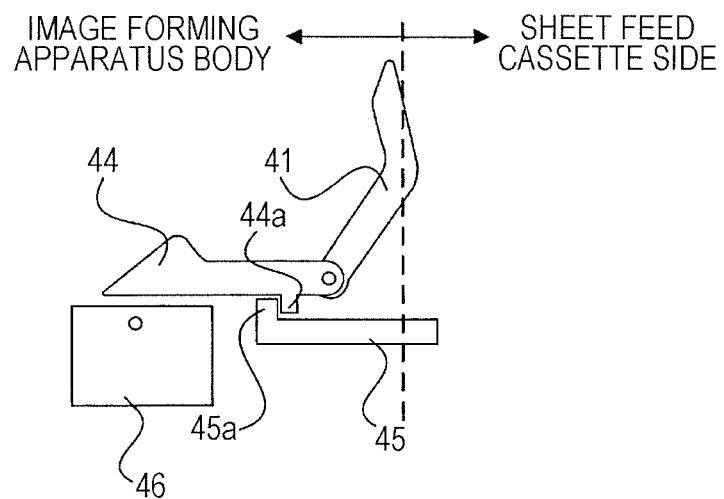
FIG. 17 is a schematic diagram showing the movement of the sheet detecting device.
Figure 18:
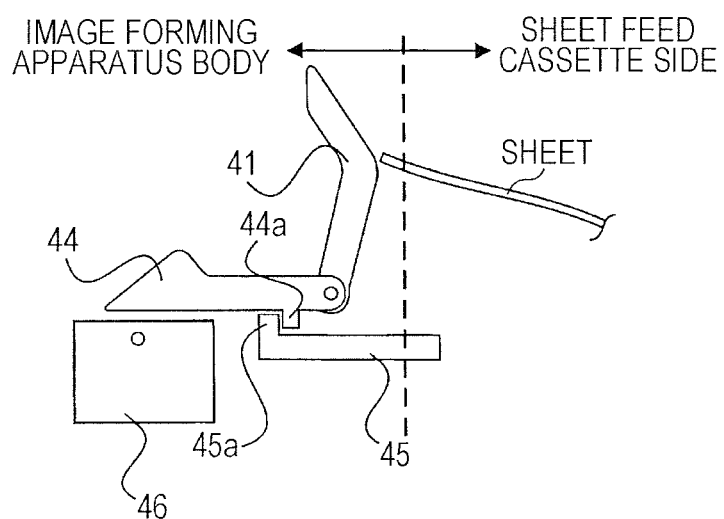
FIG. 18 is a schematic diagram showing the movement of the sheet detecting device.

FIG. 17 shows that the sheet feed cassette 30 is not attached to the image forming apparatus body 12, and there is no sheet pushing the sensor lever 41. FIG. 18 shows that the sheet feed cassette 30 is not attached to the image forming apparatus body 12, and there is a sheet pushing the sensor lever 41. More specifically, FIG. 18 is a schematic diagram showing that a sheet is left in the apparatus body when the sheet feed cassette 30 is pulled out.

Figure 19:
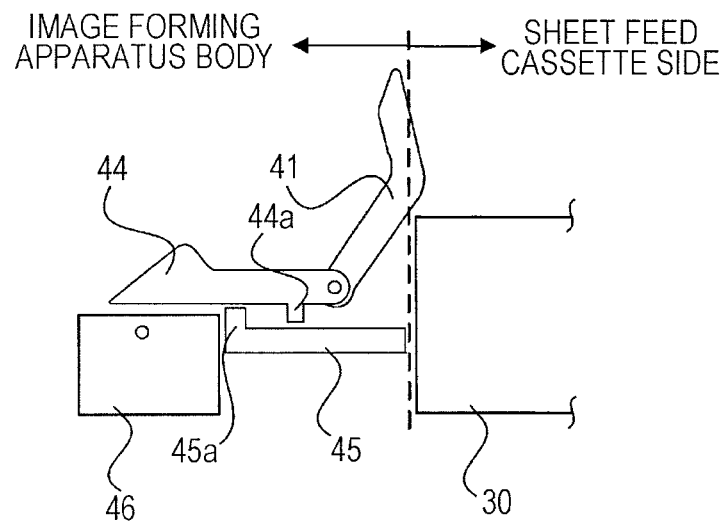
FIG. 19 is a schematic diagram showing the movement of the sheet detecting device.
Figure 20:
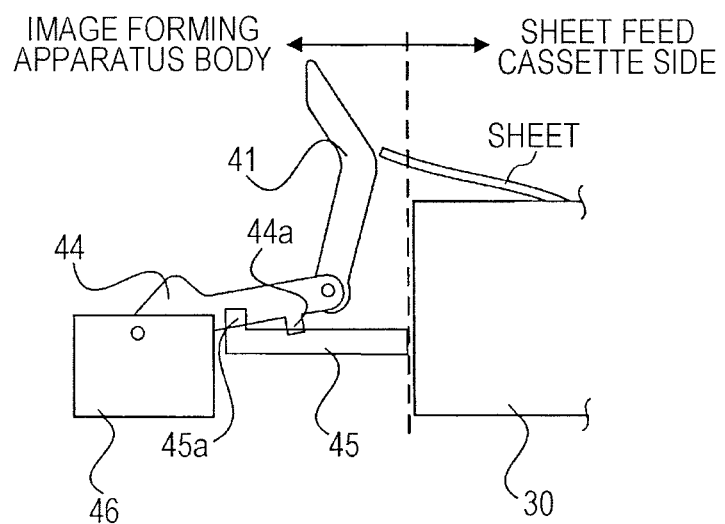
FIG. 20 is a schematic diagram showing the movement of the sheet detecting device.

FIG. 19 shows that the sheet feed cassette 30 is attached to the image forming apparatus body 12, and there is no sheet pushing the sensor lever 41. FIG. 20 shows that the sheet feed cassette 30 is attached to the image forming apparatus body 12, and there is a sheet pushing the sensor lever 41.

As shown in FIGS. 17 and 18, when the sheet feed cassette 30 is not attached to the image forming apparatus body 12, the lock lever 45a of the slider 45 locks the boss 44a of the sensor lever 44. Hence, the sensor lever 44 is fixed whether the sensor lever 41 detects the sheet or not, and the light switch 46 stays ON.

In FIGS. 19 and 20, because the sheet feed cassette 30 is attached to the image forming apparatus body 12, the slider 45 is pushed, and the lock lever 45a of the slider 45 does not lock the boss 44a of the sensor lever 44. Hence, the sensor lever 44 is released and moves in conjunction with the sensor lever 41.

In this state, in FIG. 19, because there is no sheet, the sensor lever 41 does not move from the initial position, and the sensor lever 44 also does not move from the initial position. As a result, the light switch 46 stays ON. However, in FIG. 20, because there is a sheet, the sensor lever 41 moves from the initial position, and the sensor lever 44 also moves from the initial position. As a result, the sensor lever 44 moves to a position where it blocks the light of the light switch 46, turning off the light switch 46.

The logic states of the light switch 46 corresponding to the respective states shown in FIGS. 17 to 20 are shown in FIG. 21. Referring to FIG. 21, only when the sheet feed cassette 30 is attached to the image forming apparatus body 12 and when there is a sheet, the light switch 46 is OFF.

As has been described above, this configuration enables the control unit 31 to determine that the sheets have run out, when the status of detection by the light switch 46 changes from OFF to ON during printing. Furthermore, the control unit 31 determines that the sheet feed cassette 30 has been pulled out, when the status of detection by the light switch 46 changes from OFF to ON during standby.

More specifically, because running out of sheets never occurs during standby when printing is not performed, when the logic of the light switch 46 changes from OFF to ON during standby, the control unit 31 determines that the sheet feed cassette 30 has been pulled out, not that running out of sheets has occurred.

When the sheet feed cassette 30 is pulled out with no sheets accommodated therein, the logic state of the light switch 46 stays ON. Hence, it is impossible to detect that the sheet feed cassette 30 has been pulled out. However, because there is no sheet in the sheet feed cassette 30, a situation that a sheet is left in the apparatus does not occur. Thus, inability to detect pulling out of the empty sheet feed cassette 30 is not a problem.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
    a sheet accommodating portion that is attachable to and removable from an apparatus body and that is configured to accommodate a sheet therein;
    a detecting part configured to detect the presence/absence of a sheet in the sheet accommodating portion;
    a fixing part configured to fix a detection status to a sheet absent state in response to the sheet accommodating portion being not attached to the apparatus body;
    an informing part configured to inform a user of a status of the apparatus; and
    a control part configured to cause the informing part to inform the user of a possibility of a sheet having been left in the apparatus in response to the status of detection changing from a sheet present state to the sheet absent state during standby when printing is not performed and in response to the sheet accommodating portion being removed from the apparatus body.

2. The image forming apparatus according to claim 1, wherein the control part is configured to cause the informing part to inform the user of the possibility of a sheet left in the apparatus only in response to the status of detection by the detecting part changing from the sheet present state to the sheet absent state for the first time after printing has been completed.

3. The image forming apparatus according to claim 2, wherein the control part is configured to cause the informing part to inform the user that sheets have run out in response to the status of detection by the detecting part changing from the sheet present state to the sheet absent state during printing.

4. The image forming apparatus according to claim 1, wherein the control part is configured to cause the informing part to inform the user that sheets have run out in response to status of detection by the detecting part changing from the sheet present state to the sheet absent state during printing.

5. The image forming apparatus according to claim 1, wherein the informing part is a display, and
    wherein the control part is configured to cause the display to show the possibility of a sheet left in the apparatus in response to the status of detection by the detecting part changing from the sheet present state to the sheet absent state during standby when printing is not performed.

6. The image forming apparatus according to claim 1, wherein the detecting part includes:
    a switch configured to be switched between ON and OFF by an externally applied physical force;
    a first rotation member that has a detecting lever configured to detect the presence/absence of a sheet, the detecting lever being urged toward the sheet in the sheet accommodating portion; and
    a second rotation member that is provided coaxial with the first rotation member, has a changing member configured to change a status of detection by the switch, the changing member being urged in a direction in which the switch is turned on, and rotates in a direction in which the changing member turns the switch OFF in accordance with the rotation of the first rotation member, and
    wherein the fixing part includes a slide member that has a lock lever configured to fix the second rotation member so as not to rotate with the switch kept ON, the lock lever being urged so as to fix the second rotation member, and that is pushed when the sheet accommodating portion is attached to the apparatus body, releasing the second rotation member so as to be rotatable.

7. The image forming apparatus according to claim 6, further comprising:
    a first elastic member that urges the first rotation member;
    a second elastic member that urges the second rotation member; and
    a third elastic member that urges the slide member,
    wherein the second elastic member has a larger coefficient of elasticity than a coefficient of elasticity of the first elastic member, and the third elastic member has a larger coefficient of elasticity than the second elastic member.

8. An image forming apparatus comprising:
    a sheet accommodating portion that is attachable to and removable from an apparatus body and that is configured to accommodate a sheet therein;
    a detecting part configured to detect the presence/absence of a sheet in the sheet accommodating portion;
    a fixing part configured to fix a detection status to a sheet absent state in response to the sheet accommodating portion being not attached to the apparatus body;
    an informing part configured to inform a user of a status of the apparatus; and
    a control part configured to cause the informing part to inform the user of a possibility of a sheet having been left in the apparatus in response to the status of detection changing from a sheet present state to the sheet absent state during standby when printing is not performed, wherein the detecting part includes:
 a switch configured to be switched between ON and OFF by an externally applied physical force;
 a first rotation member that has a detecting lever configured to detect the presence/absence of a sheet, the detecting lever being urged toward the sheet in the sheet accommodating portion; and
 a second rotation member that is provided coaxial with the first rotation member, has a changing member configured to change a status of detection by the switch, the changing member being urged in a direction in which the switch is turned on, and rotates in a direction in which the changing member turns the switch OFF in accordance with the rotation of the first rotation member, and wherein the fixing part includes a slide member that has a lock lever configured to fix the second rotation member so as not to rotate with the switch kept ON, the lock lever being urged so as to fix the second rotation member, and that is pushed when the sheet accommodating portion is attached to the apparatus body, releasing the second rotation member so as to be rotatable.

* * * * *